United States Patent
Lim et al.

(10) Patent No.: US 10,627,965 B2
(45) Date of Patent: Apr. 21, 2020

(54) TOUCH SENSOR AND DISPLAY DEVICE INCLUDING THE SAME

(71) Applicants: Samsung Display Co., Ltd., Yongin-si (KR); UNIST(ULSAN NATIONAL INSTITUTE OF SCIENCE AND TECHNOLOGY), Ulsan (KR)

(72) Inventors: Jae Ik Lim, Yongin-si (KR); Won Sang Park, Yongin-si (KR); Hye Yong Chu, Yongin-si (KR); Kibog Park, Ulsan (KR); Sungchul Jung, Ulsan (KR); Hanbyul Jin, Ulsan (KR)

(73) Assignee: Samsung Display Co., Ltd., Yongin-si (KR)

( * ) Notice: Subject to any disclaimer, the term of this patent is extended or adjusted under 35 U.S.C. 154(b) by 47 days.

(21) Appl. No.: 15/687,008

(22) Filed: Aug. 25, 2017

(65) Prior Publication Data

US 2018/0164919 A1 Jun. 14, 2018

(30) Foreign Application Priority Data

Dec. 14, 2016 (KR) ........................ 10-2016-0170139

(51) Int. Cl.
*G06F 3/041* (2006.01)
*G06F 3/044* (2006.01)

(52) U.S. Cl.
CPC ............ *G06F 3/044* (2013.01); *G06F 3/0414* (2013.01); *G06F 3/0416* (2013.01); *G06F 2203/04102* (2013.01); *G06F 2203/04111* (2013.01)

(58) Field of Classification Search
CPC ................................. G06F 3/041; G06F 3/045
See application file for complete search history.

(56) References Cited

U.S. PATENT DOCUMENTS 9,569,038 B2 2/2017 Doi et al.
2009/0051245 A1* 2/2009 Takayama ............ H03H 9/1092
310/313 R (Continued)

FOREIGN PATENT DOCUMENTS

EP 2434379 3/2012
KR 10-1025613 3/2011

(Continued)

OTHER PUBLICATIONS

Shanshan Yao et al., "Wearable multifuctional sensors using printed strechable conductors made of silver nanowires", Nanoscale, Dec. 5, 2013, 6, p. 2345-2352.

(Continued)

*Primary Examiner* — Pegeman Karimi
(74) *Attorney, Agent, or Firm* — H.C. Park & Associates, PLC

(57) ABSTRACT

A touch sensor including a substrate; a plurality of first touch electrodes located on the substrate, the plurality of first touch electrodes each including first sensing cells and first connection patterns connected between the first sensing cells; a plurality of second electrodes located on the substrate while intersecting the first touch electrodes, the plurality of second electrodes each including second sensing cells and second connection patterns connected between the second sensing cells; and an insulating member located between the first connection patterns and the second connection patterns, the insulating member having elasticity. A modulus of elasticity of the substrate is equal to or greater than that of the insulating member.

23 Claims, 14 Drawing Sheets

(56) References Cited

U.S. PATENT DOCUMENTS

| | | | |
|---|---|---|---|
| 2012/0038583 A1 | 2/2012 | Westhues et al. | |
| 2012/0092350 A1 | 4/2012 | Ganapathi et al. | |
| 2012/0182250 A1 | 7/2012 | Nagata et al. | |
| 2014/0320765 A1* | 10/2014 | Jiang | G06F 3/041 349/12 |
| 2015/0207102 A1* | 7/2015 | Jeong | H01L 51/5256 257/40 |
| 2016/0202820 A1* | 7/2016 | Ito | G02F 1/13306 345/173 |
| 2016/0259481 A1 | 9/2016 | Lee | |
| 2017/0228054 A1* | 8/2017 | Wu | G06F 3/041 |
| 2017/0285801 A1* | 10/2017 | Choi | G06F 3/044 |
| 2018/0095580 A1* | 4/2018 | Yi | G06F 3/0414 |
| 2018/0136754 A1* | 5/2018 | Kim | G02F 1/13338 |
| 2018/0356299 A1* | 12/2018 | Watazu | G01L 1/146 |
| 2019/0098213 A1* | 3/2019 | Kim | G06F 3/0487 |

FOREIGN PATENT DOCUMENTS

| | | |
|---|---|---|
| KR | 10-1135694 | 4/2012 |
| KR | 10-1636180 | 7/2016 |

OTHER PUBLICATIONS

Yongeun Jeon et al., "Highly flexible touch screen panel fabricated with silver nanowire crossing electrodes and transparent bridges", Journal of the Optical Society of Korea, vol. 19, No. 5, Oct. 2015, p. 508-513.

Extended European Search Report dated Apr. 13, 2018, in European Patent Application No. 17205715.0.

Office Action dated Aug. 28, 2019, in European Patent Application No. 17205715.0.

\* cited by examiner

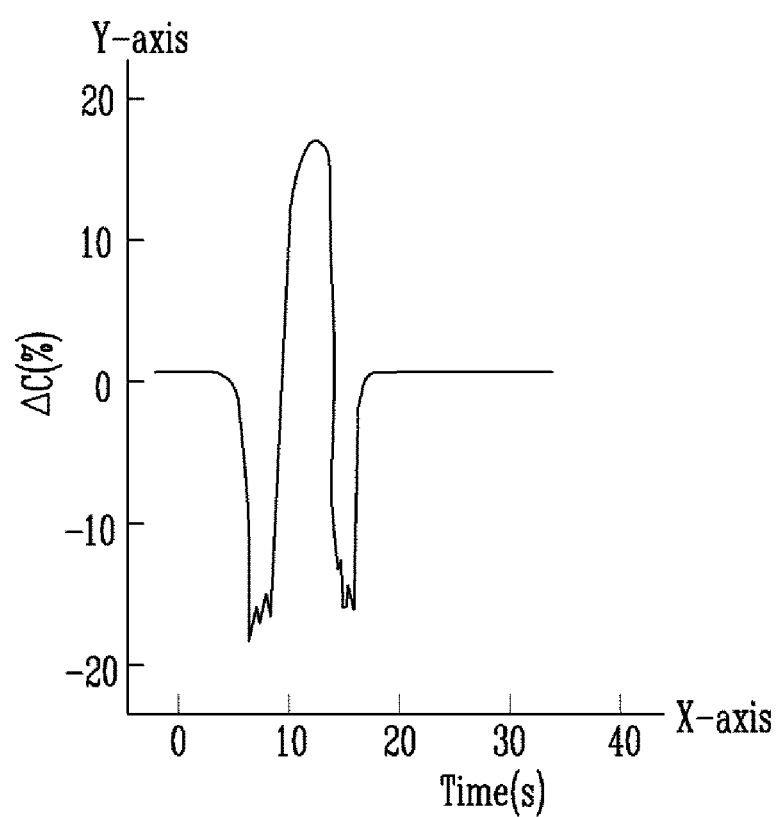

TOUCH SENSOR AND DISPLAY DEVICE INCLUDING THE SAME

CROSS-REFERENCE TO RELATED APPLICATION

This application claims priority from and the benefit of Korean Patent Application No. 10-2016-0170139, filed on Dec. 14, 2016, which is hereby incorporated by reference for all purposes as if fully set forth herein.

BACKGROUND

Field

Exemplary embodiments relate to a touch sensor and a display device including the same.

Discussion of the Background

As interest in information displays and demand for portable information media increase, research and commercialization has been directed toward display devices.

Recent developments in display devices include touch sensors for receiving touch inputs of users, in addition to image display functions. Accordingly, users can more conveniently use the display devices through the touch sensors.

Recently, various functions have been provided to users, using the pressures generated due to touches to provide information, as well as the touch positions.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch sensor capable of recognizing a touch pressure and a display device including the touch sensor.

Additional aspects will be set forth in the detailed description which follows, and, in part, will be apparent from the disclosure, or may be learned by practice of the inventive concept.

An exemplary embodiment of the present invention discloses a touch sensor including: a substrate; a plurality of first touch electrodes located on the substrate, the plurality of first touch electrodes each including first sensing cells and first connection patterns connected between the first sensing cells; a plurality of second electrodes located on the substrate while intersecting the first touch electrodes, the plurality of second electrodes each including second sensing cells and second connection patterns connected between the second sensing cells; and an insulating member located between the first connection patterns and the second connection patterns, the insulating member having elasticity, wherein a modulus of elasticity of the substrate equal to or greater than that of the insulating member.

The first connection patterns and the second connection patterns may intersect each other.

The insulating member may include a plurality of insulators located between the first connection patterns and the second connection patterns, which intersect each other, the plurality of insulators being separated from one another.

The first sensing cells and the second sensing cells may be located in the same layer.

The insulating member may be formed in a single layer located between the first connection patterns and the second connection patterns.

The insulating member may be located between the first touch electrodes and the second touch electrodes.

The first sensing cells and the second sensing cells may be located in different layers.

Each of the first connection patterns may include a first connection part connected between adjacent first sensing cells and at least one first protruding part protruding from the first connection part.

The first protruding part may overlap with an adjacent second connection pattern.

Each of the second connection patterns may include a second connection part connected between adjacent second sensing cells and at least one second protruding part protruding from the second connection part.

The second protruding part may overlap with an adjacent first connection pattern.

A concave groove corresponding to the second protruding part may be formed in at least one first sensing cell adjacent to the second protruding part.

The first connection patterns may be located above the insulators. The second connection patterns may be located under the insulators.

The first connection patterns may connect the first sensing cells through contact holes formed in the insulators.

The first connection patterns may be located under the insulators. The second connection patterns may be located above the insulators.

The first connection patterns may connect the first sensing cells through contact holes formed in the insulators.

The touch sensor may further include an additional insulating layer located between the first touch electrodes and the second touch electrodes.

The first sensing cells and the second sensing cells may be located in different layers.

The touch sensor may further include a touch controller supplying a driving signal to the first touch electrodes, the touch controller recognizing a touch using output signals of the second touch electrodes.

The touch controller may detect at least one of a position of the touch and a pressure of the touch through a change in capacitance calculated from the output signals.

The touch controller may detect the position of the touch by recognizing a decrement of the capacitance.

The touch controller may detect the pressure of the touch by recognizing an increment of the capacitance.

The touch controller may calculate a level of the pressure through the increment of the capacitance.

A distance between the first connection pattern and the second connection pattern, to which the pressure of the touch is applied, may be decreased.

The substrate may have flexibility.

The insulating member may include polydimethylsiloxane.

The substrate may be formed of the same material as the insulating member.

According to an aspect of the present disclosure, there is provided a display device including the above-described touch sensor.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 5A, FIG. 5B, and FIG. 5C are views illustrating an operation of detecting a touch pressure according to an exemplary embodiment of the present disclosure.

DETAILED DESCRIPTION OF THE ILLUSTRATED EMBODIMENTS

Figure 1:
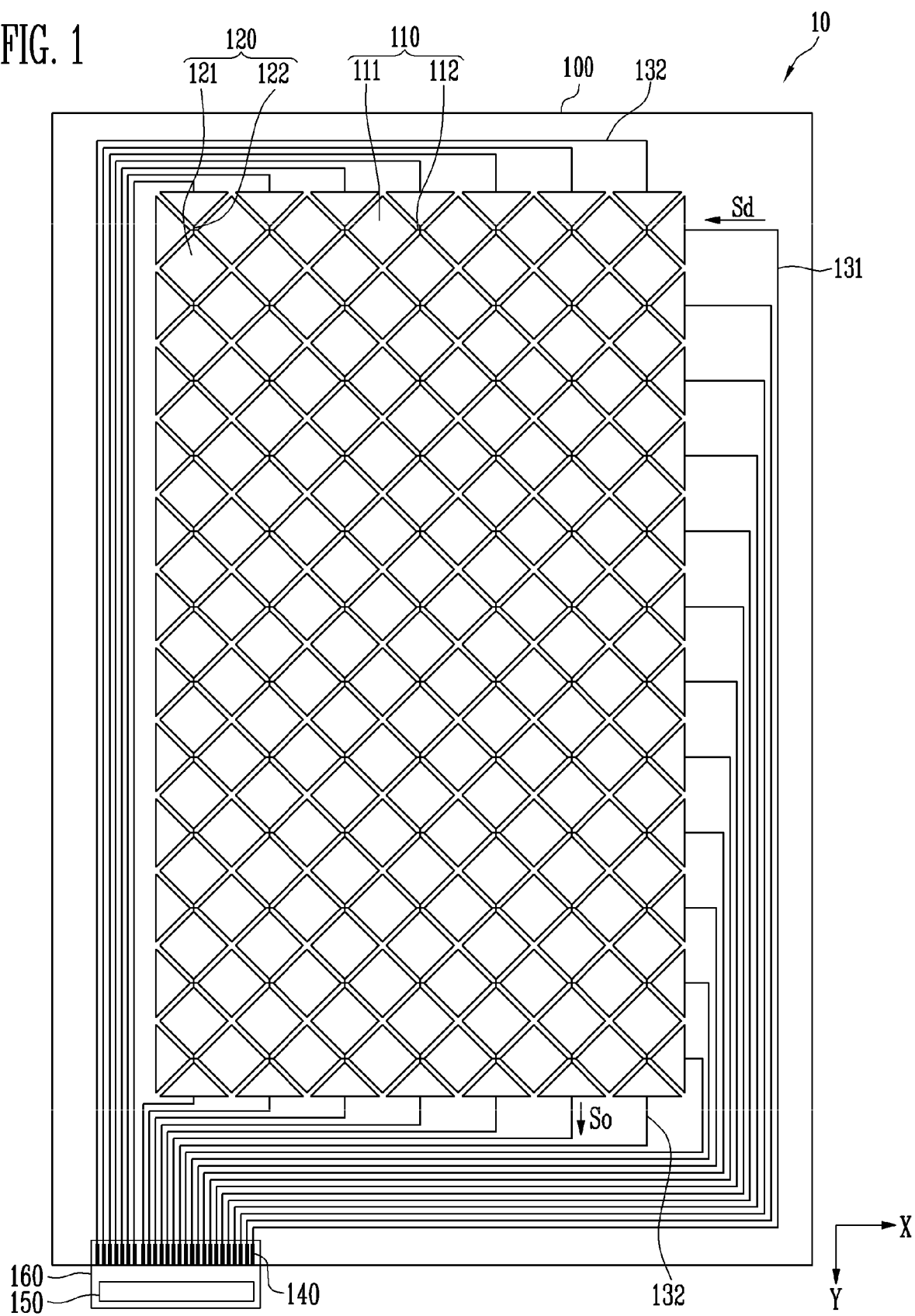
FIG. 1 is a view illustrating a touch sensor according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYZ, YZ, and ZZ. Like numbers refer to like elements throughout. As used herein, the term "and/or" includes any and all combinations of one or more of the associated listed items.

Although the terms first, second, etc. May be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

FIG. 1 is a view illustrating a touch sensor according to an exemplary embodiment of the present disclosure.

Referring to FIG. 1, the touch sensor 10 according to the exemplary embodiment of the present disclosure may include a substrate 100, first touch electrodes 110, second touch electrodes 120, and a touch controller 150.

The first touch electrodes 110 and the second touch electrodes 120 may be located on the substrate 100.

The first touch electrodes 110 are formed to extend in a first direction (e.g., an X-axis direction), and may be arranged in plural numbers along a second direction (e.g., a Y-axis direction) intersecting the first direction.

The second touch electrodes 120 are formed to extend in the second direction (e.g., the Y-axis direction), and may be arranged in plural numbers along the first direction (e.g., a Y-axis direction).

Because the first touch electrodes 110 and the second touch electrodes 120 intersect each other, the first touch electrodes 110 and the second touch electrodes 120 may be operated as a capacitive type touch sensor.

That is, mutual capacitances exist at intersection portions of the first touch electrodes 110 and the second touch electrodes 120 and, when a touch is generated in the touch sensor 10, a mutual capacitance at a position related to the touch is changed. A touch position may be detected by detecting a change in capacitance.

Each of the first touch electrodes 110 may include a plurality of first sensing cells 111 arranged at a predetermined distance along the first direction (e.g., the X-axis direction), and a plurality of first connection patterns 112 electrically connecting the first sensing cells 111 to each other.

In addition, each of the second touch electrodes 120 may include a plurality of second sensing cells 121 arranged at a predetermined distance along the second direction (e.g., the Y-axis direction), and a plurality of second connection patterns 122 electrically connecting the second sensing cells 121 to each other.

In this case, the second sensing cells may be dispersed and arranged between the first sensing cells 111 so as not to overlap with the first sensing cells 111.

In addition, the first connection patterns 112 and the second connection patterns 122 may intersect each other.

Although a case where the first sensing cells 111 and the second sensing cells 121 have a polygonal shape (e.g., a diamond shape) is illustrated in FIG. 1, the shape of the first sensing cells 111 and the second sensing cells 121 is not limited thereto, and may be modified in various ways.

The first touch electrodes 110 and the second touch electrodes 120 may include a conductive material. For example, the first touch electrodes 110 and the second touch electrodes 120 may include a metal or an alloy containing metal. The metal may be gold (Au), silver (Ag), aluminum (Al), molybdenum (MO), chromium (Cr), titanium (Ti), nickel (In), neodymium (ND), copper (Cub), platinum (Pt.), and the like.

In addition, the first touch electrodes 110 and the second touch electrodes 120 may be made of a transparent conductive material. The transparent conductive material may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, graphene, and the like. Each of the first touch electrodes 110 and the second touch electrodes 120 may be formed in a single layer or multiple layers.

The first sensing cells 111 and the first connection patterns 112 may be made of the same material or of different materials.

In addition, the second sensing cells 121 and the second connection patterns 122 may be made of the same material or of different materials.

The first sensing cells 111 and the second sensing cells 121 may be made of the same material or of different materials.

In addition, the first connection patterns 112 and the second connection patterns 122 may be made of the same material or of different materials.

The first sensing cells 111 and the second sensing cells 121 may be located on the same layer.

In this case, in order to prevent contact between the first connection patterns 112 and the second connection patterns 122, an insulating member (not shown) may be located at intersection portions of the first connection patterns 112 and the second connection patterns 122.

The first sensing cells 111 and the second sensing cells 121 may be located on different layers.

In addition, the first sensing cells 111 and the second sensing cells 121 may have a metal mesh structure.

The substrate 100 may be made of an insulative material, such as glass or resin. Also, the substrate 100 may be made of a material having flexibility or elasticity so as to be bendable or foldable. The substrate 100 may have a single-layered structure or a multi-layered structure.

For example, the substrate 100 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

However, the material constituting the substrate 100 may be variously changed, and the substrate 100 may be made of fiber glass reinforced plastic (FRP), or the like.

The substrate 100 may be implemented as a separate substrate or with various components included in a display device.

First lines 131 may be connected between the first touch electrodes 110 and pads 140. In addition, second lines 132 are connected between the second touch electrodes 120 and pads 140.

The pads 140 may be located in one region of the substrate 100, in which the touch electrodes 110 and 120 do not exist.

The lines 131 and 132 may be connected to the external touch controller 150 through the pads 140.

In order to improve touch sensitivity, at least one of the first lines 131 and the second lines 132 may have a double routing structure.

In FIG. 1, a case where the second lines 132 connected to the second touch electrodes 120 are formed in the double routing structure has been illustrated as an example.

That is, the second lines 132 may be connected to both ends of the second touch electrodes 120, respectively.

In addition, as shown in FIG. 1, the first lines 131 may have a single routing structure in which the first lines 131 are connected to only one end of each of the first touch electrodes 110.

However, the routing structures of the first lines 131 and the second lines 132 may be variously modified.

For example, both of the first lines 131 and the second lines 132 may have either the single routing structure or the double routing structure. Alternatively, the first lines 131 may have the double routing structure, and the second lines 132 may have the single routing structure.

The touch controller 150 may be connected to the pads 140 through a separate component, such as a connection member 160.

For example, the connection member 160 may include a film, a flexible printed circuit board, and the like.

Accordingly, the touch controller 150 can be electrically connected to the first touch electrodes 110 and the second touch electrodes 120 through the first lines 131 and the second lines 132.

The touch controller 150 may supply driving signals Sd to the first touch electrode 110 through the first lines 131, and receive output signals So from the second touch electrodes 120 through the second lines 132.

However, the present disclosure is not limited thereto. On the contrary, the touch controller 150 may supply driving signals Sd to the second touch electrodes 120 through the second lines 132, and receive output signals So from the first touch electrodes 110 through the first lines 131.

The touch controller 150 may be installed utilizing various methods including chip on glass, chip on plastic, tape carrier package, chip on film, and the like.

Figure 2:
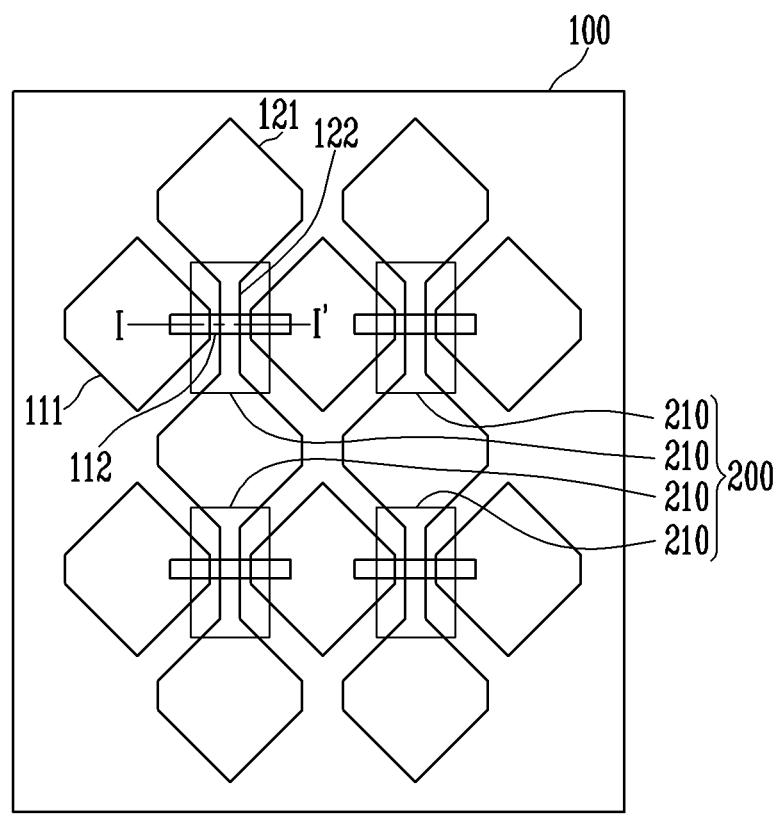
FIG. 2 is an enlarged view of some of the touch electrodes shown in FIG. 1.
Figure 3:
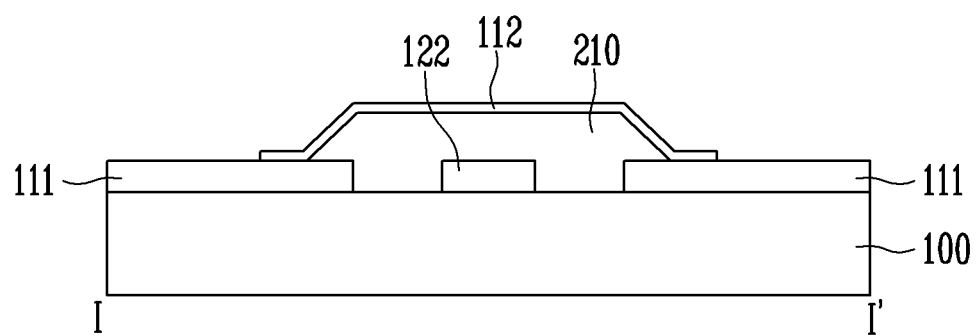
FIG. 3 is a view illustrating a section taken along line I-I' of FIG. 2.

FIG. 2 is an enlarged view of some of the touch electrodes shown in FIG. 1. FIG. 3 is a view illustrating a section taken along line I-I' of FIG. 2.

Referring to FIG. 2, the touch sensor 10 according to the exemplary embodiment of the present disclosure may further include an insulating member 200.

The insulating member 200 may be located between the first connection patterns 112 and the second connection patterns 122 that intersect each other. Accordingly, contact between the first connection patterns 112 and the second connection patterns 122 can be prevented.

Also, the insulating member 200 may have elasticity to be deformable in response to an external pressure.

For example, as shown in FIG. 2, the insulating member 200 may include a plurality of insulators 210 respectively located at intersection portions of the first connection patterns 112 and the second connection patterns 122, the plurality of insulators 210 being separated from one another.

The first sensing cells 111, the second sensing cells 121, and the second connection patterns 122 may be located on the same layer (e.g., the substrate 100), and the insulators 210 may be located on the second connection patterns 122, respectively. In addition, the first connection patterns 112 may be located on the insulators 210, respectively.

Referring to FIG. 3, two first sensing cells 111 adjacent to each other may be electrically connected through a first connection pattern 112 passing over an insulator 210.

For example, one end of the first connection pattern 112 may be connected to the first sensing cell 111 located at the left side, and the other end of the first connection pattern 112 may be connected to the first sensing cell 111 located at the right side.

In addition, two second sensing cells adjacent to each other may be electrically connected through the second connection pattern 122 passing under the insulator 210.

Figure 4A:
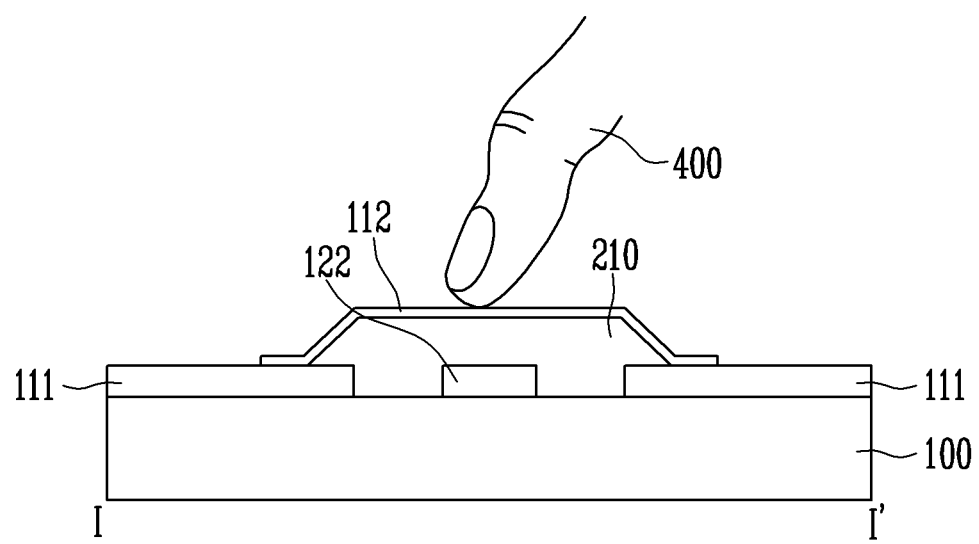
FIG. 4A and FIG. 4B are views illustrating an operation of detecting a touch position according to an exemplary embodiment of the present disclosure.
Figure 4B:
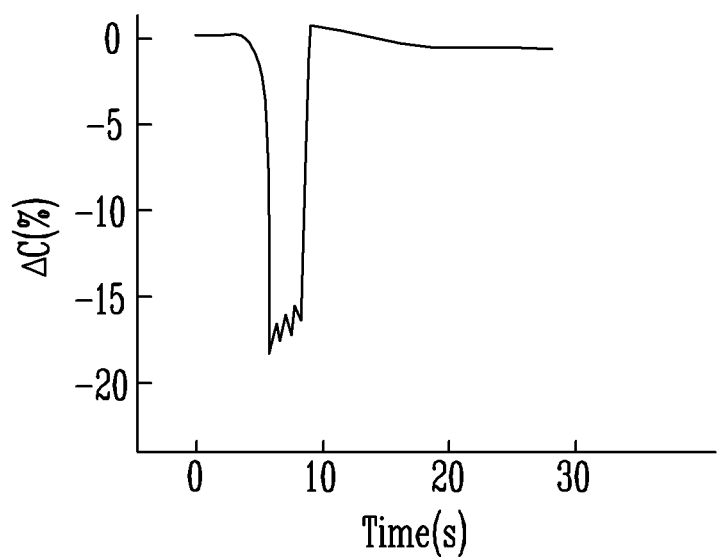

FIGS. 4A and 4B are views illustrating an operation of detecting a touch position according to an exemplary embodiment of the present disclosure. Particularly, the X and Y axes of FIG. 4B represent time and variation in capacitance (ΔC), respectively.

Referring to FIG. 4A, a touch may be generated by a finger 400 of a user or a conductor (not shown). Particularly, a touch event that is not accompanied with a substantial pressure has been illustrated in FIG. 4A.

In this case, a capacitance between the first touch electrode 110 and the second touch electrode 120 is decreased by the touch of the finger 400 as shown in FIG. 4B.

Therefore, when a capacitance calculated from an output signal So of the second touch electrode 120 is changed in a negative (−) direction, the touch controller 150 may recognize that a touch has been generated.

For example, a change in capacitance may detected by comparing a capacitance value calculated from the output signal So with a preset touch reference value. Accordingly, the touch controller 150 may recognize that the change in capacitance has been generated in the negative direction.

In addition, the touch controller 150 may recognize, as an actual touch, only when a difference between the capacitance value calculated from the output signal So and the touch reference value is equal to or greater than a threshold value.

As described above, the touch controller 150 may detect a touch position through a change in capacitance calculated from output signals So.

Figure 5A:
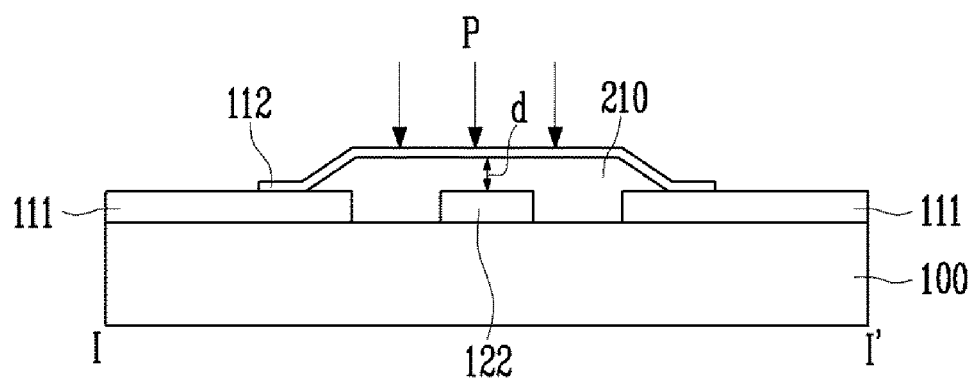
Figure 5B:
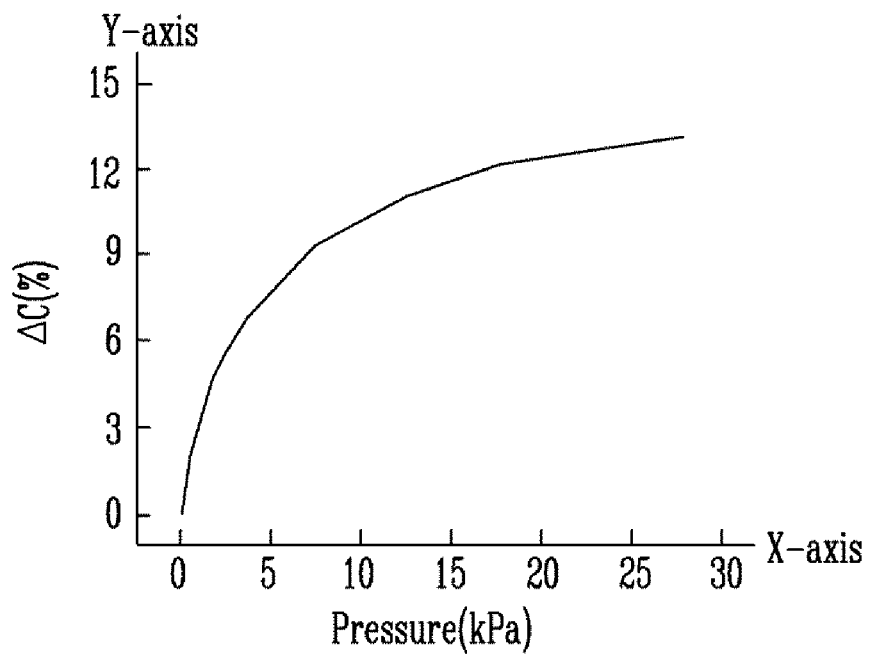

FIGS. 5A, 5B, and 5C are views illustrating an operation of detecting a touch pressure according to an exemplary embodiment of the present disclosure. Particularly, FIG. 5B represents a variation in capacitance (ΔC) (Y-axis) with a change in pressure (X-axis), and FIG. 5C represents a variation in capacitance (ΔC) (Y-axis) with time (X-axis).

Referring to FIG. 5A, a touch may be generated by a finger 400 of a user, a conductor (not shown), a non-conductor (not shown), or the like. Particularly, a touch event accompanied with a pressure P is illustrated in FIG. 5A. In addition, a case where a pressure is applied using the non-conductor is illustrated in FIG. 5B, and a case where a pressure is applied using the finger 400 or the conductor has been illustrated in FIG. 5C.

In this case, a distance d between the first connection pattern 112 and the second connection pattern 122 is decreased by a touch pressure P. This is because the thickness of the insulator 210 having elasticity is decreased by the touch pressure P.

Accordingly, a capacitance between the first connection pattern 112 and the second connection pattern 122 is increased.

As a result, as shown in FIG. 5B, the capacitance between the first connection pattern 112 and the second connection pattern 122 is increased as the touch pressure P is increased.

However, since a change in thickness of the insulator 210 is limited, the capacitance between the first connection pattern 112 and the second connection pattern 122 may be no longer increased when the touch pressure P exceeds a specific value.

Therefore, when a capacitance calculated from an output signal So of the second touch electrode 120 is changed in a positive (+) direction, the touch controller 150 may recognize that a touch has been generated.

For example, the touch controller 150 may detect a change in capacitance by comparing a capacitance value calculated from the output signal So with a preset pressure reference value. Accordingly, the touch controller 150 may recognize that the change in capacitance has been generated in the positive direction.

Also, the touch controller 150 may calculate a level of a touch pressure P by detecting a variation (e.g., an increment) in capacitance.

For example, the touch controller 150 may determine the level of the touch pressure P to be increased as the variation in capacitance is increased.

When a touch pressure P is applied by the finger 400 of the user or the conductor (not shown), a capacitance between the first touch electrode 110 and the second touch electrode 120 may be changed as shown in FIG. 5C.

That is, the capacitance is decreased at the moment when the finger 400 of the user is in contact with the touch sensor 10 (generation of a first negative peak), and then increased as a touch pressure P is applied by the finger 400 (generation of a positive peak). That is, since an increment of the capacitance generated by the touch pressure is greater than a decrement of the capacitance generated by the contact of the finger 400, there is a net increase in capacitance.

Subsequently, since the touch pressure P is reduced in a process of separating the finger 400 from the touch sensor 10, the capacitance is gradually decreased again. After that, since the moment when the finger 400 is in contact with the touch sensor 10 without accompanying a pressure P is again generated, a second negative peak is generated.

After that, if the finger 400 is completely separated from the touch sensor 10, the capacitance returns to the original state.

Meanwhile, a modulus of elasticity of the substrate 100 is set to be equal to or greater than that of the insulating member 200.

The modulus of elasticity represents a degree of deformation occurring when a stress is applied to an elastic material. The deformation may be decreased as the modulus of elasticity is increased, and be increased as the modulus of elasticity is decreased.

For example, when a modulus of elasticity of the substrate 100 is less than that of the insulating member 200, the thickness of the insulating member 200 is not changed or may be minutely changed as compared with the substrate 100, when an external pressure P is applied to the touch sensor 10.

In this case, the distance between the first connection pattern 112 and the second connection pattern 122 is not changed or may be minutely changed, which causes a difficulty in sensing a pressure.

In other words, a rigidity of the substrate 100 is set to be equal to or greater than that of the insulating member 200.

Therefore, when the same pressure P is applied, the substrate 100 may have a deformation equal to or smaller than that of the insulating member 200.

For example, the insulating member 200 may include at least one of polydimethylsiloxane, silicon, polyethylene terephthalate, acryl-based resin, and epoxy-based resin.

Also, the insulating member 200 may include well-known elastic materials such as polyolefin-based, PVC-based, polystyrene-based, polyester-based, polyurethane-based, and polyamide-based materials.

The insulating member 200 may be formed of a material having elasticity and dielectric permittivity. The material constituting the insulating member 200 is not limited thereto and may be variously changed.

Also, the insulating member 200 may be formed of the same material as the substrate 100.

Figure 6A:
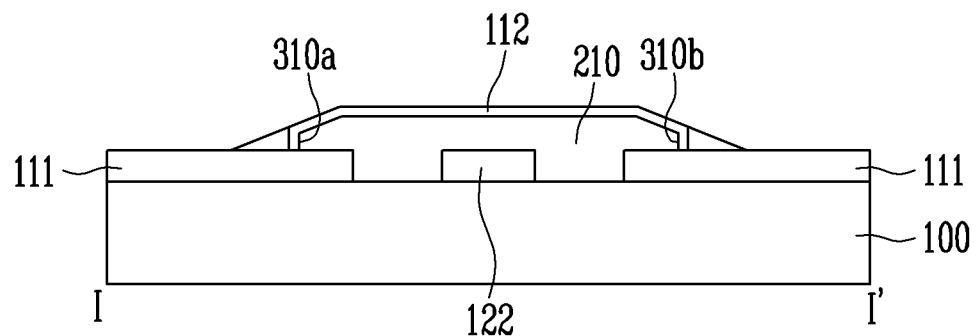
FIG. 6A, FIG. 6B, and FIG. 6C are views illustrating sections of touch electrodes according to an exemplary embodiment of the present disclosure.
Figure 6B:
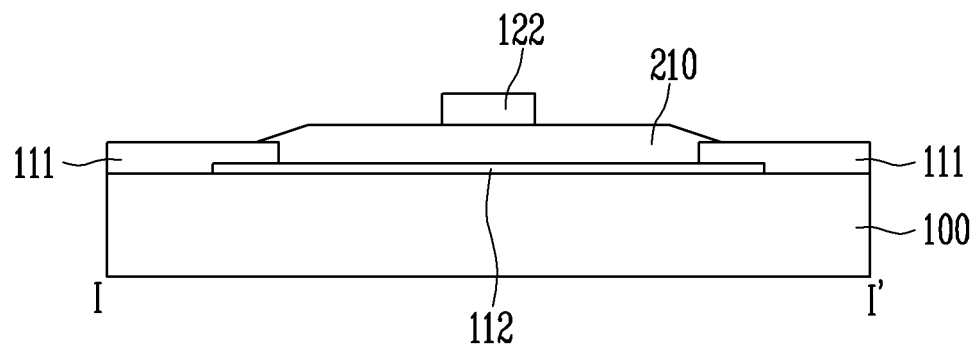
Figure 6C:
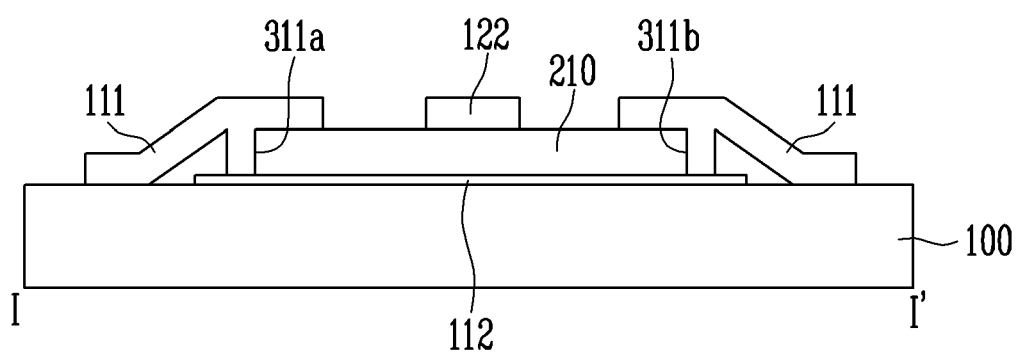

FIGS. 6A, 6B, and 6C are views illustrating sections of touch electrodes according to an exemplary embodiment of the present disclosure.

FIG. 6A illustrates a structure in which the first connection pattern 112 is located above the insulator 210 and the second connection pattern 122 is located under the insulator 210.

The structure is similar to that of the exemplary embodiment related to FIG. 3. However, in this exemplary embodiment, the first connection pattern 112 may be connected to adjacent first sensing cells 111 through contact holes 310a and 310b formed in the insulator 210.

For example, one end of the first connection pattern 112 may be connected to the first sensing cell 111 located at the left side through a first contact hole 310a, and the other end of the first connection pattern 112 may be connected to the first sensing cell 111 located to the right side through a second contact hole 310b.

FIG. 6B illustrates a structure in which the first connection pattern 112 is located under the insulator 210 and the second connection pattern 122 is located on the insulator 210.

In this case, the first sensing cells 111, the second sensing cells 121, and the first connection patterns 112 may be located on the same layer (e.g., the substrate 100), and the insulators 210 may be located on the first connection patterns 112, respectively. In addition, the second connection patterns 122 may be located on the insulators 210, respectively.

Accordingly, two first sensing cells 111 adjacent to each other may be electrically connected through the first connection pattern 112 passing under the insulator 210.

In addition, two second sensing cells 121 adjacent to each other may be electrically connected through the second connection pattern 122 passing over the insulator 210.

A structure shown in FIG. 6C is similar to that of FIG. 6B. However, in this exemplary embodiment, the first connection pattern 112 may be connected to adjacent first sensing cells 111 through contact holes 311a and 311b formed in the insulator 210.

In this case, the first sensing cells 111 may partially overlap with both ends of the first connection pattern 112, respectively, and the insulator 210 may be located at the overlapping portions of the first sensing cells 111 and the first connection pattern 112.

At this time, the contact holes 311a and 311b may be formed in the insulator 210, and accordingly, the first connection pattern 112 may be electrically connected to the first sensing cells 111.

For example, one end of the first connection pattern 112 may be connected to the first sensing cell 111 located at the left side through a first contact hole 311a, and the other end of the first connection pattern 112 may be connected to the first sensing cell 111 located at the right side through a second contact hole 311b.

Figure 7:
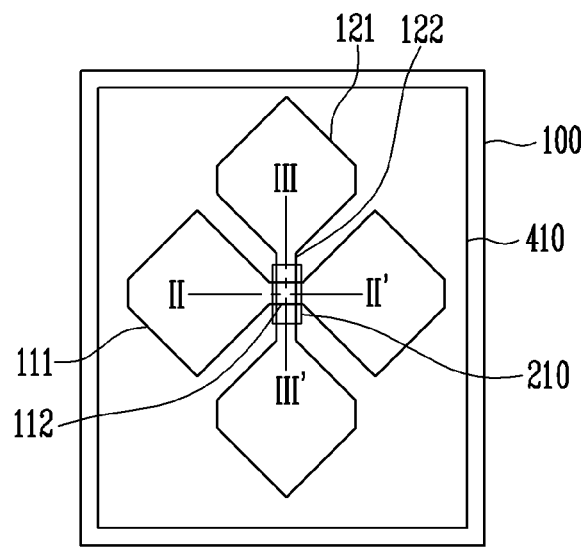
FIG. 7 is a view illustrating some touch electrodes according to an exemplary embodiment of the present disclosure.
Figure 8A:
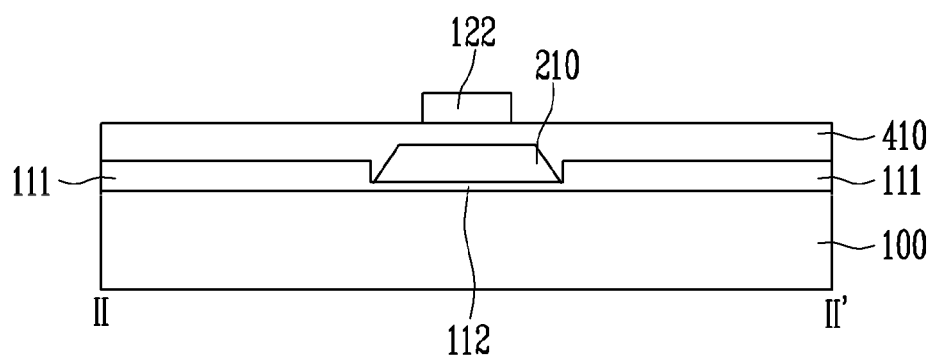
FIG. 8A is a view illustrating a section taken along line II-II' of FIG. 7.
Figure 8B:
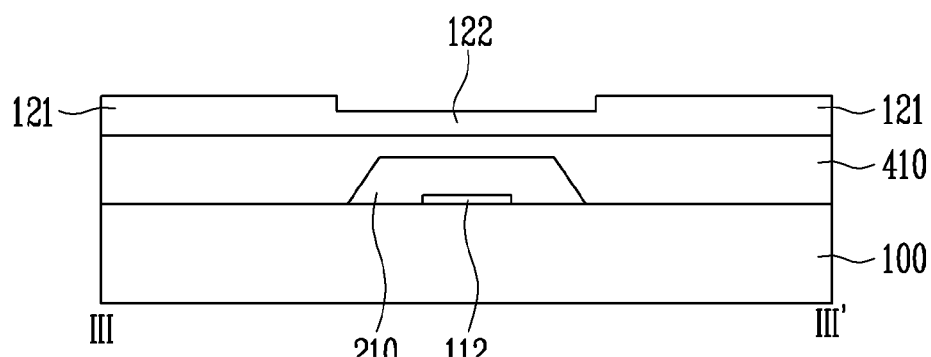
FIG. 8B is a view illustrating a section taken along line III-III' of FIG. 7.

FIG. 7 is a view illustrating some touch electrodes according to an exemplary embodiment of the present disclosure. FIG. 8A is a view illustrating a section taken along line II-II' of FIG. 7. FIG. 8B is a view illustrating a section taken along line III-III' of FIG. 7.

Referring to FIGS. 7, 8A, and 8B, the touch sensor 10 according to the exemplary embodiment of the present disclosure may further include an additional insulating layer 410.

The additional insulating layer 410 may be located between the first touch electrodes 110 and the second touch electrodes 120. Accordingly, the first touch electrodes 110 and the second touch electrodes 120 may be located in different layers.

For example, the first sensing cells 111 and the first connection patterns 112 may be located on the substrate 100, and the second sensing cells 121 and the second connection patterns 122 may be located on the additional insulating layer 410.

In this exemplary embodiment, in order to perform pressure sensing as in the above-described exemplary embodiment, the insulators 210 may be located between the first connection patterns 112 and the second connection patterns 122, respectively.

For example, as shown in FIGS. 8A and 8B, the insulator 210 may be located on the first connection pattern 112, and the additional insulating layer 410 may be located between the second connection pattern 122 and the insulator 210.

Although not separately illustrated, positions of the insulator 210 and the additional insulating layer 410 may be interchanged with each other.

For example, the additional insulating layer 410 may be located on the first connection pattern 112, and the insulator 210 may be located between the second connection pattern 122 and the additional insulating layer 410.

Figure 9:
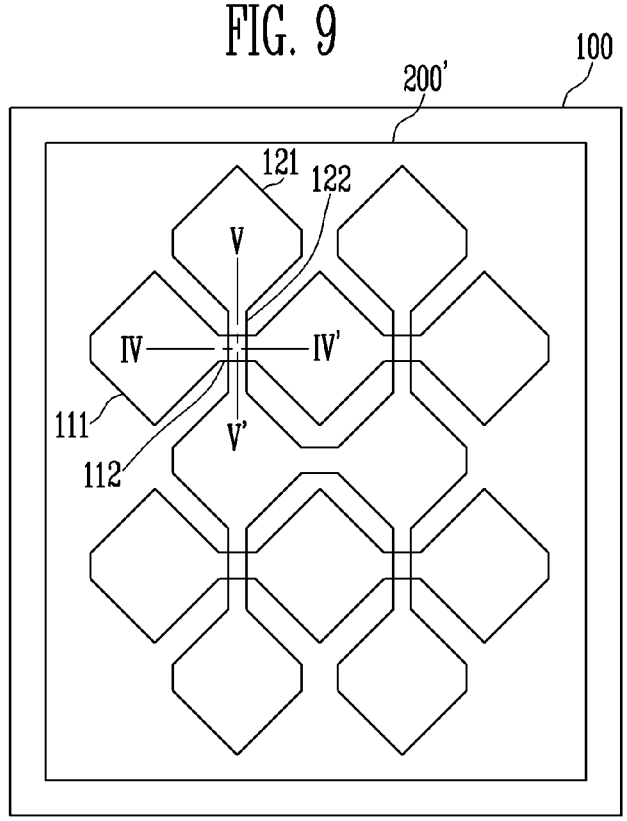
FIG. 9 is a view illustrating some touch electrodes according to an exemplary embodiment of the present disclosure.
Figure 10A:
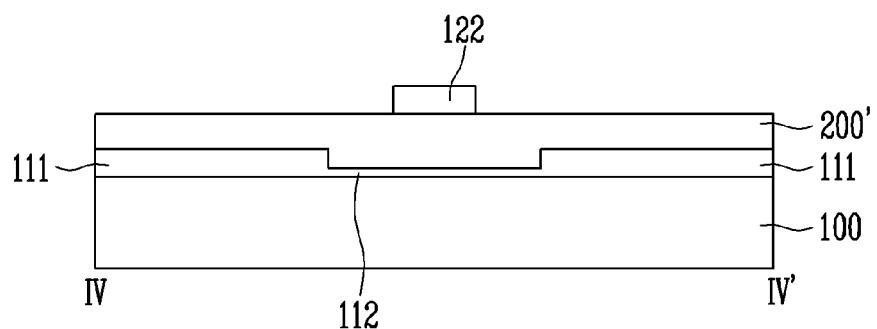
FIG. 10A is a view illustrating a section taken along line IV-IV' of FIG. 9.

FIG. 9 is a view illustrating some touch electrodes according to an exemplary embodiment of the present disclosure. FIG. 10A is a view illustrating a section taken along line IV-IV' of FIG. 9, and FIG. 10B is a view illustrating a section taken along line V-V' of FIG. 9.

Figure 10B:
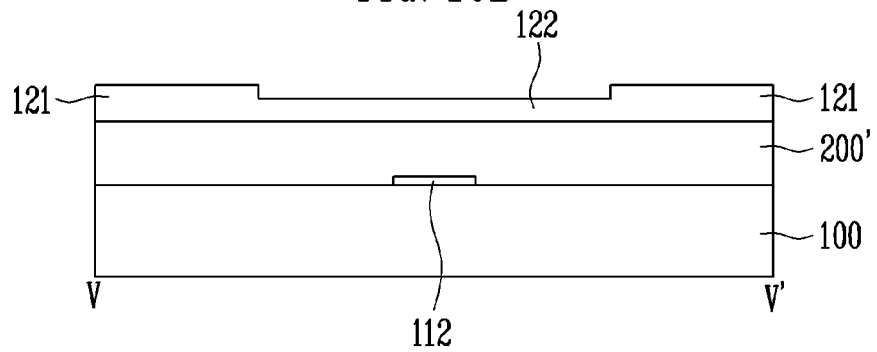
FIG. 10B is a view illustrating a section taken along line V-V' of FIG. 9.

Referring to FIGS. 9, 10A, and 10B, an insulating member 200' according to the exemplary embodiment of the present disclosure may be formed in a single layer.

That is, unlike the insulating member 200 including a plurality of insulators 200, the insulating member 200' of this exemplary embodiment may be formed entirely between the first touch electrodes 110 and the second touch electrodes 120.

Accordingly, the first touch electrodes 110 and the second touch electrodes 120 may be located in different layers.

For example, the first sensing cells 111 and the first connection patterns 112 may be located on the substrate 100, and the second sensing cells 121 and the second connection patterns 122 may be located on the insulating member 200'.

When an external pressure is applied, the insulating member 200' generates a change in distance between the first connection patterns 112 and the second connection patterns 122, and thus, pressure sensing can also be performed in this exemplary embodiment.

FIGS. 11A, 11B, 11C, 11D, 11E, and 11F are views illustrating various exemplary embodiments of the insulator. Here, illustration of the first connection pattern 112 is omitted for convenience of description.

Figure 11A:
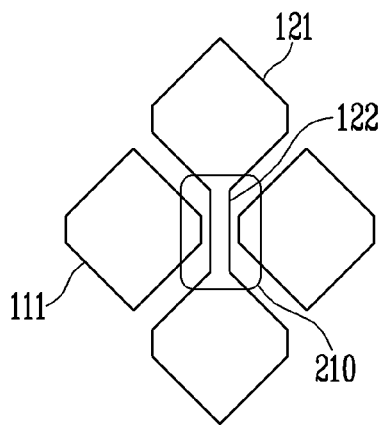
FIG. 11A, FIG. 11B, FIG. 11C, FIG. 11D, FIG. 11E, and FIG. 11F are views illustrating various exemplary embodiments of an insulator.
Figure 11B:
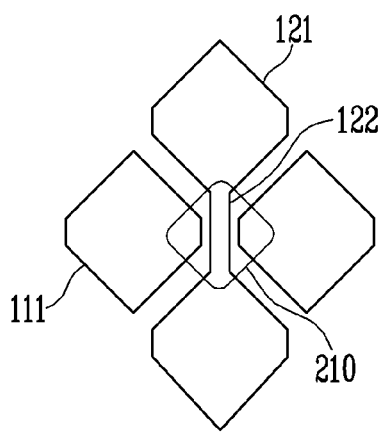
Figure 11C:
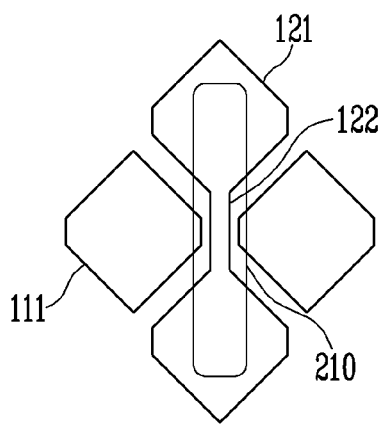

Referring to FIGS. 11A, 11B, and 11C, the insulator 210 may have polygonal shapes.

For example, the insulator 210 may have a quadrangular shape, as shown in FIG. 11A, or a diamond shape, as shown in FIG. 11B.

In addition, as shown in FIG. 11C, the insulator 210 may have a bar shape formed to extend in one direction.

Figure 11D:
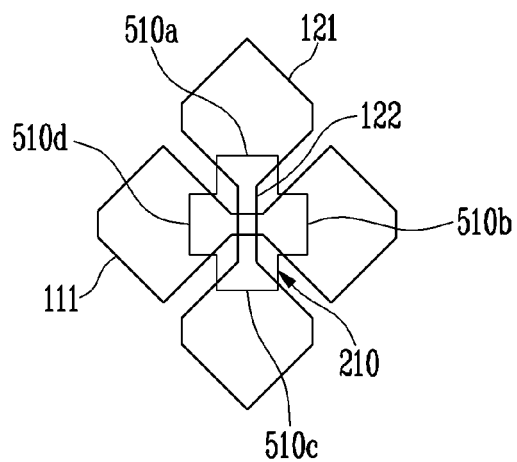

Referring to FIG. 11D, the insulator 210 may have a cross (+) shape. For example, the insulator 210 may include four protruding parts 510a, 510b, 510c, and 510d respectively protruding in top, bottom, left, and right directions.

Figure 11E:
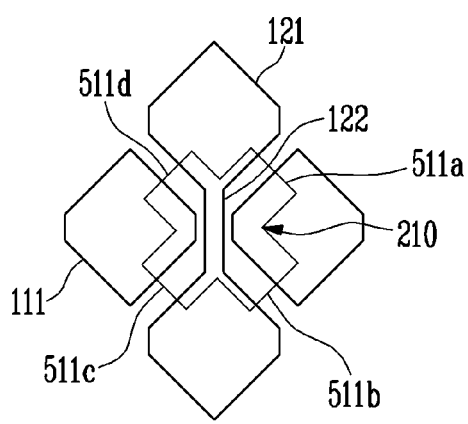

Referring to FIG. 11E, the insulator 210 may have an X shape. For example, the insulator 210 may include four protruding parts 511a, 511b, 511c, and 511c respectively protruding along an oblique direction.

Figure 11F:
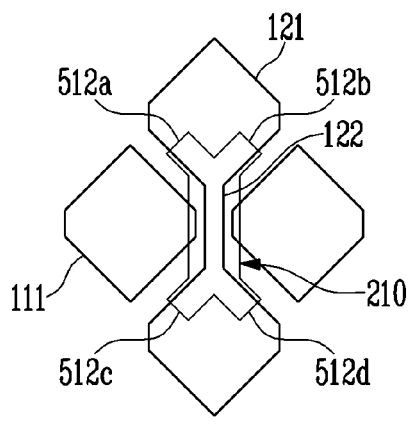

Referring to FIG. 11F, the insulator 210 may have a Y shape. For example, the insulator 210 may include two protruding parts 512a and 512b protruding in the Y shape from one end thereof and two protruding parts 512c and 512d protruding in the Y shape from the other end thereof.

The shape of the insulator 210 is not limited to the above-described exemplary embodiments, and may be modified in various shapes such as a circular shape.

Figure 12A:
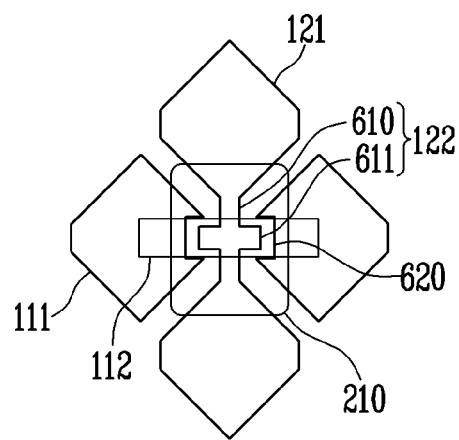
FIG. 12A and FIG. 12B are views illustrating various exemplary embodiments of a second connection pattern.
Figure 12B:
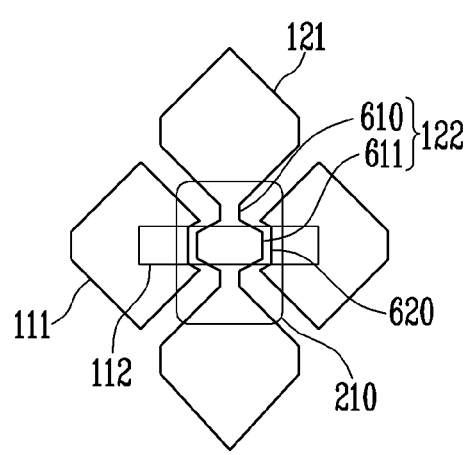

FIGS. 12A and 12B are views illustrating various exemplary embodiments of the second connection pattern.

Referring to FIG. 12A, a second connection pattern 122 according to an exemplary embodiment of the present disclosure may include a second connection part 610 and a second protruding part 611.

The second connection part 610 may be connected between two adjacent second sensing cells 121, and the second protruding part 611 may be formed to protrude from the second connection part 610.

For example, at least one second protruding part 611 may be formed. In FIG. 12A, a state in which two second protruding parts 611 are connected to the second connection part 610 has been illustrated as an example.

In this case, the second protruding part 611 may overlap with an adjacent first connection pattern 112. Accordingly, the overlapping area of the first connection pattern 112 and the second connection pattern 122 may be increased.

As a result, since a capacitance formed between the first connection pattern 112 and the second connection pattern 122 is increased by the above-described structure, the sensitivity of pressure sensing can be further increased.

In order to prevent contact between the second protruding part 611 and adjacent first sensing cells 111, concave grooves 620 corresponding to the protruding parts 611 may be formed in the first sensing cells 111, respectively.

Referring to FIG. 12B, the second protruding part 611 may have a shape of which width is decreased as it comes close to an adjacent first sensing cell 111. For example, the second protruding part 611 may have a trapezoidal shape.

In this structure, the overlapping area of the first connection pattern 112 and the second connection pattern 122 may also be increased. As a result, the sensitivity of pressure sensing can be increased.

The shape of the second protruding part 611 is not limited to the above-described exemplary embodiments, and may be modified to have various shapes.

Figure 13A:
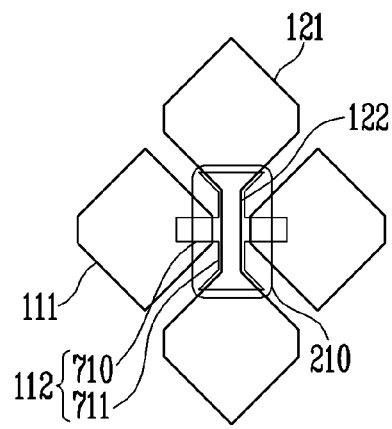
FIG. 13A, FIG. 13B, and FIG. 13C are views illustrating various exemplary embodiments of a first connection pattern.
Figure 13B:
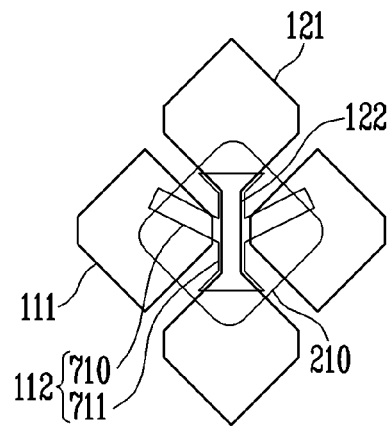
Figure 13C:
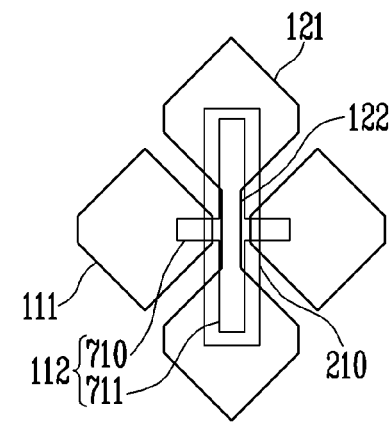

FIGS. 13A, 13B, and 13C are views illustrating various exemplary embodiments of the first connection pattern.

Referring to FIG. 13A, a first connection pattern 112 according to an exemplary embodiment of the present disclosure may include a first connection part 710 and a first protruding part 711.

The first connection part 710 may be connected between two adjacent first sensing cells 111, and the first protruding part 711 may be formed to protrude from the first connection part 710.

In FIG. 13A, a state in which two first protruding parts 711 are connected to the first connection part 710 has been illustrated as an example.

In this case, the first protruding part 711 may overlap with an adjacent second connection pattern 122. Accordingly, the overlapping area of the first connection pattern 112 and the second connection pattern 122 may be increased.

As a result, since a capacitance formed between the first connection pattern 112 and the second connection pattern 122 is increased by the above-described structure, the sensitivity of pressure sensing can be further increased.

Referring to FIG. 13B, at least one portion of the first connection part 710 may have a horizontal line and an inclination. For example, the first connection part 710 may have a bent shape as shown in FIG. 13B.

In this case, the insulator 210 having a diamond shape may be disposed between the first connection pattern 112 and the second connection pattern 122.

Referring to FIG. 13C, the first protruding part 711 may be formed to extend long along the arrangement direction (e.g., the Y-axis direction) of the second sensing cells 121.

Accordingly, the first protruding part 711 may partially overlap with not only the second connection pattern 122 but also adjacent second sensing cells 121.

In this case, the insulator 210 having a bar shape may be disposed between the first connection pattern 112 and the second connection pattern 122.

Accordingly, a capacitance related to the first connection pattern 112 can be increased, and the sensitivity of pressure sensing can also be increased.

Figure 14:
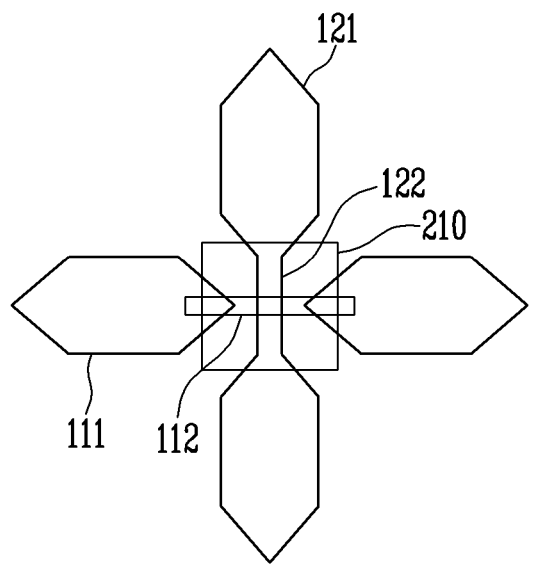
FIG. 14 is a view illustrating another exemplary embodiment of a sensing cell.

FIG. 14 is a view illustrating another exemplary embodiment of a sensing cell.

Referring to FIG. 14, a distance between the first sensing cells 111 and the second sensing cells 121 may be set to be greater than that of FIG. 2.

To this end, the first sensing cells 111 may have a hexagonal shape extending long along the arrangement direction (e.g., the X-axis direction) thereof, and the second sensing cells 121 may have a hexagonal shape extending along the arrangement direction (e.g., the Y-axis direction) thereof.

Therefore, a capacitance between the first sensing cells 111 and the second sensing cells 121, which is a factor that RC delay increases, may be decreased, and accordingly, the sensitivity of pressure sensing can be increased.

Figure 15:
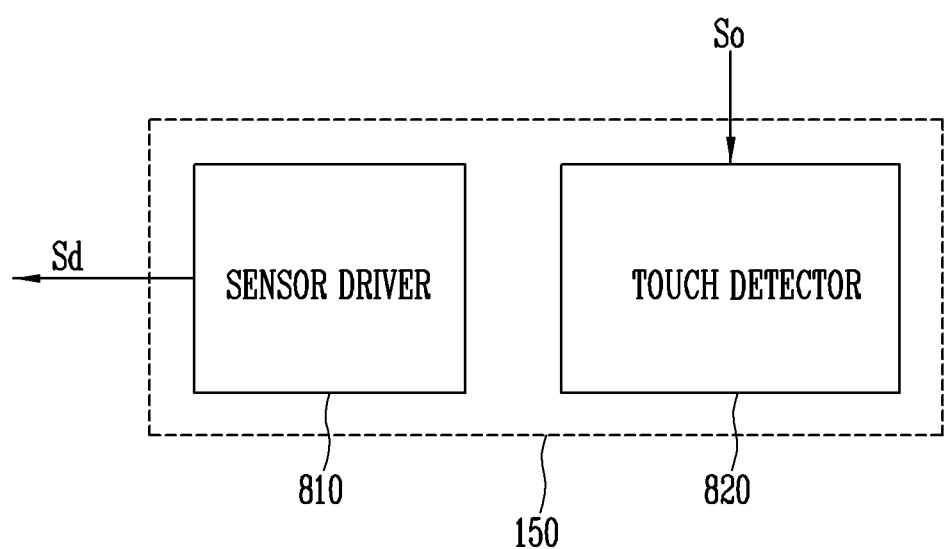
FIG. 15 is a view illustrating a touch controller according to an exemplary embodiment of the present disclosure.

FIG. 15 is a view illustrating a touch controller according to an exemplary embodiment of the present disclosure.

Referring to FIG. 15, the touch controller 150 according to the exemplary embodiment of the present disclosure may include a sensor driver 810 and a touch detector 820.

The sensor driver 810 may output a driving signal Sd for driving the touch sensor 10.

For example, the sensor driver 810 may sequentially supply the driving signal Sd to the first touch electrodes 110.

The touch detector 820 may receive output signals So for touch recognition.

For example, the touch detector 820 may receive the output signals So from the second touch electrodes 120.

The touch detector 820 may calculate a change in capacitance related to each coordinate of the touch sensor 10, using the received output signals So, and recognize a touch position and a touch pressure using the calculated change in capacitance.

Figure 16A:
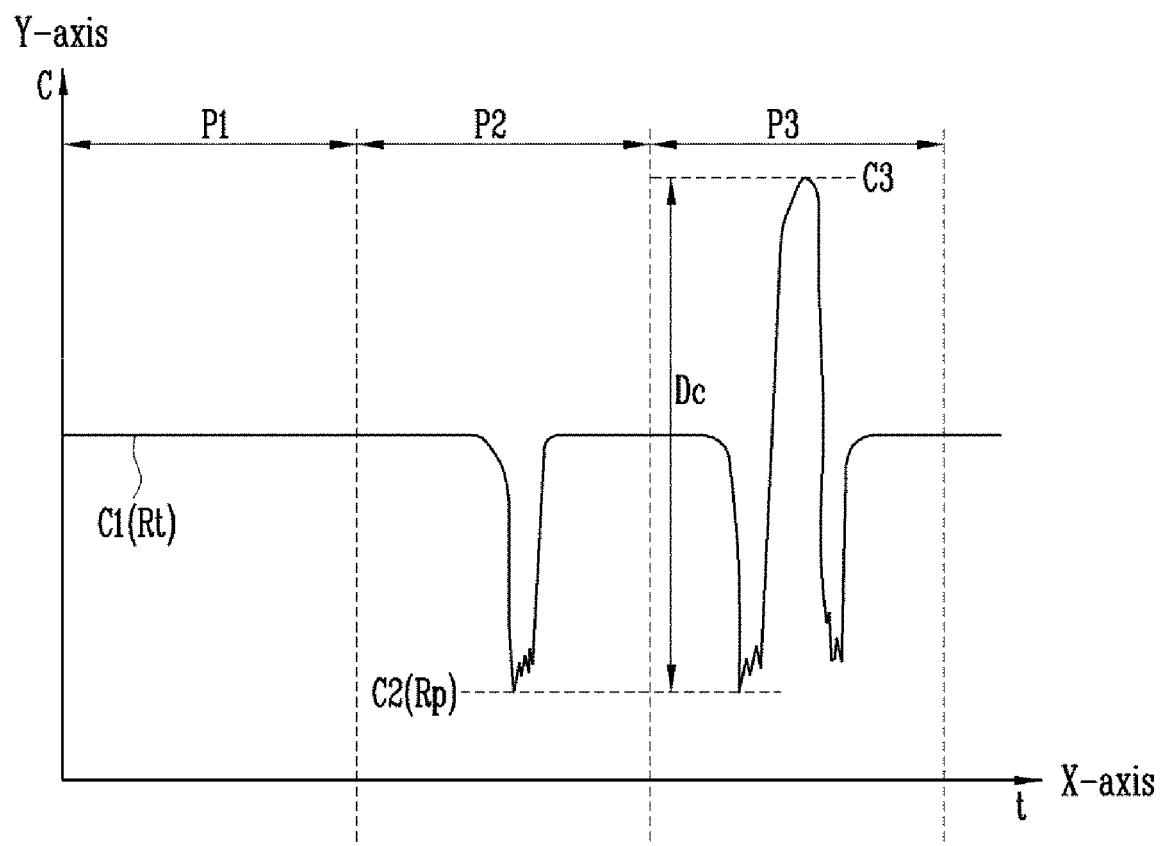
FIG. 16A and FIG. 16B are views illustrating an operation of the touch controller according to an exemplary embodiment of the present disclosure.
Figure 16B:
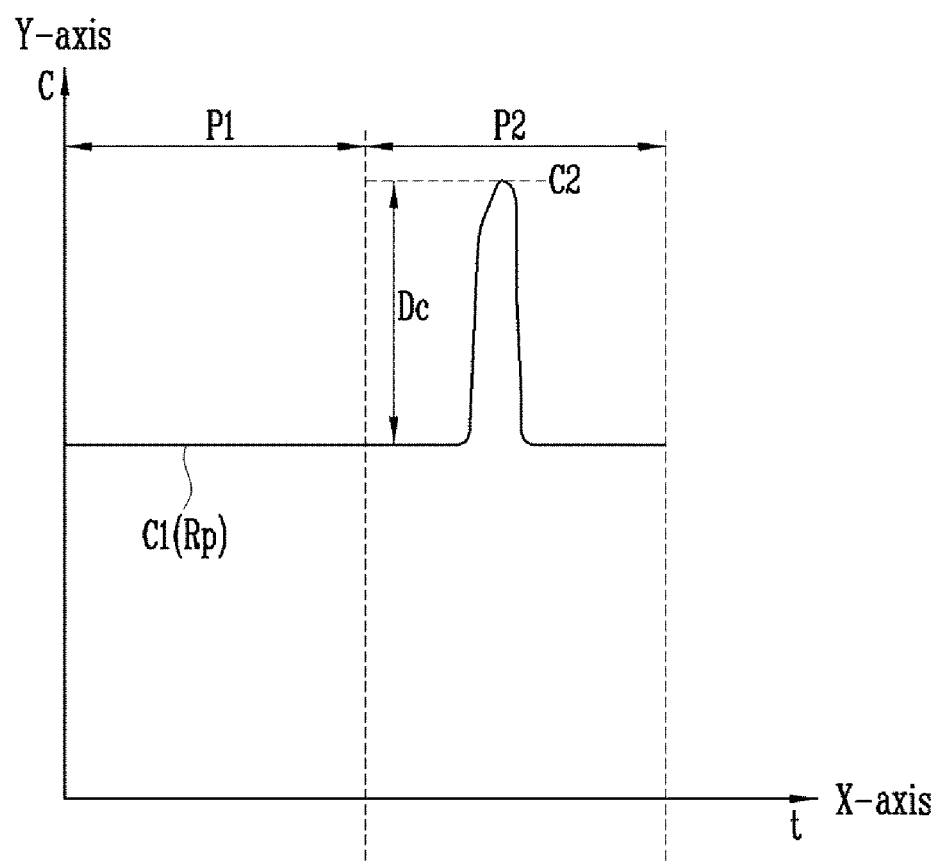

FIGS. 16A and 16B are views illustrating an operation of the touch controller according to an exemplary embodiment of the present disclosure.

FIG. 16A illustrates a case where a user performs a touch using a finger of the user or a conductor, and the X and Y axes of FIG. 16A represent time and capacitance C calculated from output signal So, respectively.

Referring to FIG. 16A, a first period P1 for determining a touch reference value Rt is first performed.

During the first period P1, the sensor driver 810 may sequentially supply the driving signal Sd to the first touch electrodes 110, and the touch detector 820 may calculate capacitances C1 related to the respective coordinates of the touch sensor, using the output signals So received from the second touch electrodes 120.

The first period P1 means a period in which any touch is not generated by the user, and accordingly, the calculated capacitances C1 may be set to touch reference values Rt of the respective coordinates.

A second period P2 means a period in which a first touch is generated by the user. For example, the first touch may mean a relatively slight touch that is not accompanied with a substantial pressure.

During the second period P2, the sensor driver 810 may sequentially supply the driving signal Sd to the first touch electrodes 110, and the touch detector 820 may calculate capacitances C2 related to the respective coordinates of the touch sensor 10, using the output signals So received from the second touch electrodes 120.

In this case, the calculated capacitances C2 may have values lower than the touch reference value Rt. The touch detector 820 may compare the capacitances C2 of the respective coordinates with the touch reference value Rt, and detect one or more coordinates of which difference from the touch reference value Rt is equal to or greater than a threshold value as positions at which the first touch is generated.

In addition, the touch detector 820 may set capacitances C2 detected during the second period P2 as pressure reference values Rp. In this case, the pressure reference values Rp may be equally set with respect to all coordinates of the touch sensor 10, or be differently set for the respective coordinates.

A third period P3 means a period in which a second touch is generated by the user. For example, the second touch may mean a relatively strong touch that is accompanied with a pressure.

During the third period P3, the sensor driver 810 may sequentially supply the driving signal Sd to the first touch electrodes 110, and the touch detector 820 may calculate capacitances C3 related to the respective coordinates, using the output signals So received from the second touch electrodes 120.

In this case, the calculated capacitances C3 may have values higher than the pressure reference value Rp. The touch detector 820 may compare the capacitances C3 of the respective coordinates with the pressure reference value Rp, and detect coordinates of which difference Dc from the pressure reference value Rp is equal to or greater than a threshold value as positions at which the second touch is generated.

In addition, the touch detector 820 may detect a pressure of the second touch using the difference Dc between the calculated capacitances C3 and the pressure reference value Rp. That is, the pressure of the second touch may be detected to be higher as the difference Dc becomes greater.

FIG. 16B illustrates a case where the user performs a touch using a non-conductor, and the X and Y axes of FIG. 16B represent time and capacitance C calculated from output signal So, respectively.

Referring to FIG. 16, a first period P1 for determining a pressure reference value Rp is first performed.

During the first period P1, the sensor driver 810 may sequentially supply the driving signal Sd to the first touch electrodes 110, and the touch detector 820 may calculate capacitances C1 related to the respective coordinates, using the output signals So received from the second touch electrodes 120.

The first period P1 represents a period in which any touch is not generated by the user, and accordingly, the calculated capacitances C1 may be set to pressure reference values of the respective coordinates.

In this case, the pressure reference value Rp may have the same value as the above-described touch reference value Rt.

A second period P2 means a period in which a second touch is generated by the user. For example, the second touch may mean a relatively strong touch that is accompanied with a pressure.

When the user performs a touch using the non-conductor, a dielectric constant of the non-conductor is greater than that of air, and hence a capacitance may be increased. In addition, when a pressure is accompanied with the touch, the distance d between the first connection pattern 112 and the second connection pattern 122 is decreased, which may cause an increase in capacitance.

During the second period P2, the sensor driver 810 may sequentially supply the driving signal Sd to the first touch electrodes 110, and the touch detector 820 may calculate capacitances C2 related to the respective coordinates of the touch sensor 10, using the output signals So received from the second touch electrodes 120.

In this case, the calculated capacitances C2 may have values higher than the pressure reference value Rp. The touch detector 820 may compare the capacitances C2 of the respective coordinates with the pressure reference value Rp, and detect one or more coordinates of which difference from the pressure reference value Rp is equal to or greater than a threshold value as positions at which the second touch is generated.

In addition, the touch detector 820 may detect a pressure of the second touch using a difference Dc between the calculated capacitances C2 and the pressure reference value Rp. That is, the pressure of the second touch may be detected higher as the difference Dc becomes larger.

Figure 17A:
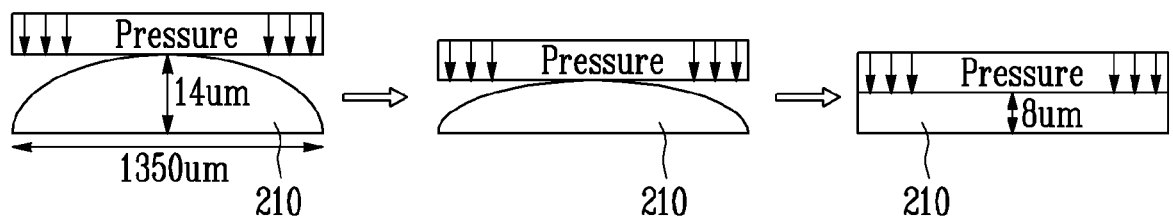
FIG. 17A and FIG. 17B are views illustrating shapes of the insulator according to an exemplary embodiment of the present disclosure.
Figure 17B:
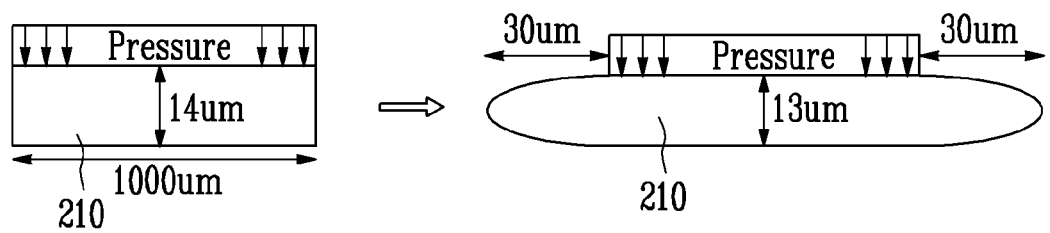

FIGS. 17A and 17B are views illustrating shapes of the insulator according to an exemplary embodiment of the present disclosure. Hereinafter, simulation results when the insulator 210 is formed in a hemispherical shape (e.g., a semi-elliptical shape) using polydimethylsiloxane and when the insulator 210 is formed in a quadrangular shape (e.g., a rectangular shape) using polydimethylsiloxane will be described.

Referring to FIG. 17A, the insulator 210 may be formed in a semi-elliptical shape. Since the Poisson ratio of polydimethylsiloxane is 0.5, the volume of the insulator 210 can be constantly maintained even when an external pressure is applied. The Young's modulus of polydimethylsiloxane is 360 to 870 kPa.

Accordingly, when an external pressure is applied, the shape of the insulator 210 may be changed, as shown in FIG. 17A.

The thickness of the insulator 210 may be decreased according to a pressure. For example, the insulator 210 has an initial thickness of 14 μm. The thickness of the insulator 210 may be decreased to 8 μm according to an external pressure.

When the insulator 210 is formed in the semi-elliptical shape, if a pressure is applied, the shape of the insulator 210 may be changed to a rectangular shape in a state in which the length (e.g., 1350 μm) of its bottom side is maintained.

As described above, when the shape of the insulator 210 is changed, it may be estimated that the capacitance will be increased to about 30%.

Referring to FIG. 17B, the insulator 210 may be formed in a rectangular shape. When an external pressure is applied, the insulator 210 is to protrude to 30 μm or more to both sides thereof such that the thickness of the insulator 210 is decreased by 1 μm based on an initial thickness of 14 μm. In this case, it is expected that a capacitance of the rectangular insulator 210 will be increased by about 7%, which is slightly lower than that of the semi-elliptical insulator 210.

In addition, it can be seen that the structure of the rectangular insulator 210 is slightly unstable as compared with the structure of the semi-elliptical insulator 210.

Figure 18:
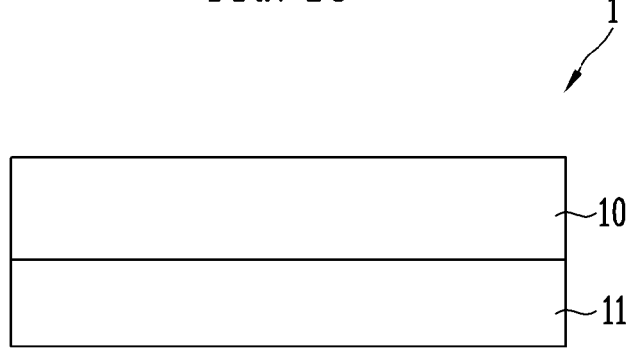
FIG. 18 is a view illustrating a display device according to an exemplary embodiment of the present disclosure.

FIG. 18 is a view illustrating a display device according to an exemplary embodiment of the present disclosure.

Referring to FIG. 18, the display device 1 according to the exemplary embodiment of the present disclosure may include a touch sensor 10 and a display panel 11.

The touch sensor 10 may recognize a touch of a user, which is input to the display device 1, and a pressure caused by the touch of the user.

The structure and operation of the touch sensor 10 have already been described in detail, and therefore, their descriptions will be omitted.

The display panel 11 is a device for providing images to the user, and may display an image through a plurality of pixels.

For example, the display panel 11 may be an organic light emitting display panel that includes an organic light emitting device.

However, the present disclosure is not limited thereto, and the kind of the display panel 11 may be variously modified.

The display device 1 may be a flexible display device. To this end, each of the components included in the display device 1, i.e., the display panel 11 and the touch sensor 10 may have flexibility.

The coupling method of the touch sensor 10 and the display panel 11 may be variously implemented. For example, after each of the touch sensor 10 and the display panel 11 is separately manufactured, the touch sensor 10 and the display panel 11 may be attached to each other.

In addition, the touch sensor 10 and the display panel 11 may be integrated through an in-cell manner, an on-cell manner, or the like.

Components constituting the touch sensor 10 may be integrated with components constituting the display panel 11. For example, at least some of the touch electrodes 110 and 120 may be integrated with a color filter (not shown) and a black matrix (not shown) in the display panel 11.

According to the present disclosure, it is possible to provide a touch sensor capable of recognizing a touch pressure and a display device including the touch sensor.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch sensor comprising:
   a substrate;
   a plurality of first touch electrodes disposed on the substrate, the plurality of first touch electrodes each comprising first sensing cells and first connection patterns connected between the first sensing cells;
   a plurality of second touch electrodes disposed on the substrate while intersecting the first touch electrodes, the plurality of second touch electrodes each comprising second sensing cells and second connection patterns connected between the second sensing cells;
   an insulating member disposed between the first connection patterns and the second connection patterns, the insulating member having elasticity; and
   a touch controller configured to supply a driving signal to the first touch electrodes and recognize a touch using output signals of the second touch electrodes,
   wherein:
   a modulus of elasticity of the substrate is equal to or greater than that of the insulating member;
   the touch controller is configured to detect a pressure of the touch with a position of the touch through a change in capacitance calculated from the output signals;
   the first sensing cells, the second sensing cells, and the second connection patterns are disposed in a same layer;
   each of the first connection patterns comprises a first connection part connected between adjacent first sensing cells and at least one first protruding part protruding from the first connection part; and the at least one first protruding part overlaps with an adjacent second connection pattern and at least a portion of the second sensing cells.

2. The touch sensor of claim 1, wherein the first connection patterns and the second connection patterns intersect each other.

3. The touch sensor of claim 2, wherein the insulating member comprises a plurality of insulators disposed between the first connection patterns and the second connection patterns, which intersect each other, the plurality of insulators being separated from one another.

4. The touch sensor of claim 3, wherein:
the first connection patterns are disposed above the insulators; and
the second connection patterns are disposed under the insulators.

5. The touch sensor of claim 4, wherein the first connection patterns connect the first sensing cells through contact holes formed in the insulators.

6. The touch sensor of claim 3, wherein:
the first connection patterns are disposed under the insulators; and
the second connection patterns are disposed above the insulators.

7. The touch sensor of claim 6, wherein the first connection patterns connect the first sensing cells through contact holes formed in the insulators.

8. The touch sensor of claim 3, further comprising an additional insulating layer disposed between the first touch electrodes and the second touch electrodes.

9. The touch sensor of claim 8, wherein the first sensing cells and the second sensing cells are disposed in different layers.

10. The touch sensor of claim 1, wherein the insulating member is formed in a single layer disposed between the first connection patterns and the second connection patterns.

11. The touch sensor of claim 10, wherein the insulating member is disposed between the first touch electrodes and the second touch electrodes.

12. The touch sensor of claim 10, wherein the first sensing cells and the second sensing cells are disposed in different layers.

13. The touch sensor of claim 1, wherein the touch controller is configured to detect the position of the touch by recognizing a decrement of the capacitance.

14. The touch sensor of claim 1, wherein the touch controller is configured to detect the pressure of the touch by recognizing an increment of the capacitance.

15. The touch sensor of claim 14, wherein the touch controller is configured to calculate a level of the pressure through the increment of the capacitance.

16. The touch sensor of claim 15, wherein a distance between the first connection pattern and the second connection pattern, to which the pressure of the touch is applied, is decreased.

17. The touch sensor of claim 1, wherein the substrate has flexibility.

18. The touch sensor of claim 17, wherein the substrate is formed of a same material as the insulating member.

19. The touch sensor of claim 1, wherein the insulating member comprises polyethylene terephthalate.

20. A display device comprising the touch sensor of claim 1.

21. A touch sensor comprising:
a substrate;
a plurality of first touch electrodes disposed on the substrate, the plurality of first touch electrodes each comprising first sensing cells and first connection patterns connected between the first sensing cells;
a plurality of second touch electrodes disposed on the substrate while intersecting the first touch electrodes, the plurality of second touch electrodes each comprising second sensing cells and second connection patterns connected between the second sensing cells;
an insulating member disposed between the first connection patterns and the second connection patterns, the insulating member having elasticity; and
a touch controller configured to supply a driving signal to the first touch electrodes and recognize a touch using output signals of the second touch electrodes,
wherein:
a modulus of elasticity of the substrate is equal to or greater than that of the insulating member;
the touch controller is configured to detect a pressure of the touch with a position of the touch through a change in capacitance calculated from the output signals;
the first sensing cells, the second sensing cells, and the second connection patterns are disposed in a same layer; and
each of the second connection patterns comprises a second connection part connected between adjacent second sensing cells and at least one second protruding part protruding from the second connection part toward at least one of the first sensing cells.

22. The touch sensor of claim 21, wherein the second protruding part overlaps with an adjacent first connection pattern.

23. The touch sensor of claim 21, wherein a concave groove corresponding to the second protruding part is formed in at least one first sensing cell adjacent to the second protruding part.

* * * * *

UNITED STATES PATENT AND TRADEMARK OFFICE
CERTIFICATE OF CORRECTION

PATENT NO. : 10,627,965 B2  
APPLICATION NO. : 15/687008  
DATED : April 21, 2020  
INVENTOR(S) : Jae Ik Lim et al.

Page 1 of 1

It is certified that error appears in the above-identified patent and that said Letters Patent is hereby corrected as shown below:

On the Title Page

Item (73) Assignee:
Add second assignee "UNIST(ULSAN NATIONAL INSTITUTE OF SCIENCE AND TECHNOLOGY), Ulsan (KR)"

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*